Patented June 19, 1951

2,557,505

UNITED STATES PATENT OFFICE 2,557,505

PRODUCTION OF DIARYLALKANES

Vladimir N. Ipatieff and Herman Pines, Chicago, Ill., assignors to Universal Oil Products Company, Chicago, Ill., a corporation of Delaware No Drawing. Application March 24, 1950,
Serial No. 151,825

16 Claims. (Cl. 260—668)

This application is a continuation-in-part of our copending application Serial Number 788,645 filed November 28, 1947, now Patent Number 2,526,896, issued October 24, 1950, and which in turn is a continuation-in-part of our application Serial Number 619,430, filed September 29, 1945, and now abandoned.

This invention relates to a process for producing a diarylalkane and particularly for producing a diphenylalkane.

An object of this invention is the production of a diarylalkane.

Another object of this invention is the production of a diphenylalkane hydrocarbon.

A further object of this invention is the production of alkyl diaryl and cycloalkyl diarylalkane hydrocarbons.

A still further object of this invention is the production of an alkyl diphenylalkane.

Additional objects of this invention are the production of 1-p-tolyl-1-(2-methyl-5-ethylphenyl)-ethane and 1-p-tolyl-1-(2-methyl-5-n-propylphenyl)-propane.

One specific embodiment of this invention relates to a process for producing an unsymmetrical diarylalkane hydrocarbon which comprises reacting at hydrogen transfer conditions in the presence of an acid-acting catalyst a tertiary alkylated phenol and an aromatic hydrocarbon having two hydrocarbon radical substituents in para position to each other and in which at least one of these radicals has only two hydrogen atoms combined with the carbon atom that is joined to the aromatic ring.

Another embodiment of this invention relates to a process for producing an unsymmetrical diarylalkane hydrocarbon which comprises reacting at hydrogen transfer conditions in the presence of an acid-acting catalyst a tertiary alkyl phenol and an aromatic hydrocarbon having two hydrocarbon radical substituents in para positions to each other and in which at least one of these radicals has only two hydrogen atoms combined with the carbon atom that is joined to the aromatic ring.

A further embodiment of this invention relates to a process for producing an unsymmetrical diarylalkane hydrocarbon which comprises reacting at hydrogen transfer conditions in the presence of an acid-acting catalyst a tertiary cycloalkylphenol and an aromatic hydrocarbon having two hydrocarbon radical substituents in para positions to each other and in which at least one of these radicals has only two hydrogen atoms combined with the carbon atom that is joined to the aromatic ring.

A still further embodiment of this invention relates to a process for producing an unsymmetrical diarylalkane hydrocarbon which comprises reacting at hydrogen transfer conditions in the presence of an acid-acting catalyst a tertiary alkylated phenol and a benzene hydrocarbon of the formula

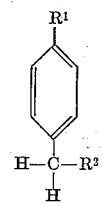

wherein each of $R^1$ and $R^2$ is selected from the group consisting of an alkyl radical, a cycloalkyl radical, a cycloalkalkyl radical, and a bicycloalkyl radical. By the term "cycloalkalkyl" is meant a hydrocarbon radical in which a cycloalkyl group replaces a hydrogen atom of an alkyl group. A cycloalkalkyl radical is thus a cycloalkyl derivative of an alkyl radical.

We have developed a method of producing diarylalkanes by effecting a hydrogen transfer reaction between a tertiary alkylated phenol and an aromatic hydrocarbon containing at least two and generally not more than five hydrocarbon radical substituents with two of these substituents in para positions. Also at least one of said para substituents has only two hydrogen atoms combined with the carbon atom that is joined to the aromatic ring.

The essential reaction of this process is illustrated by the following equation:

wherein R represents a tertiary alkyl group or a tertiary cycloalkyl group and each of $R^1$ and $R^2$ is selected from the group consisting of an alkyl radical, a cycloalkyl radical, a cycloalkalkyl radical, and a bicycloalkyl radical.

Similarly, the production of 1-p-tolyl-1-(2-methyl-5-ethyl-phenyl)-ethane from 1-methyl- 4-ethylbenzene and a 4-t-alkylated phenol is illustrated by the following equation:

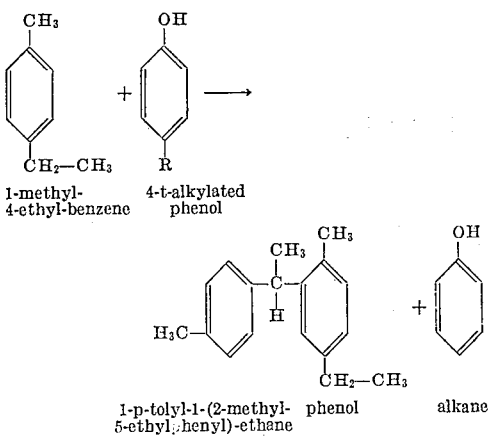

Hydrogen transfer between 1-methyl-4-n-propylbenzene and a tertiary alkylated phenol such as tertiary butylphenol takes place according to the following equation to form 1-p-tolyl-1-(2-methyl-5-n-propylphenyl)-propane.

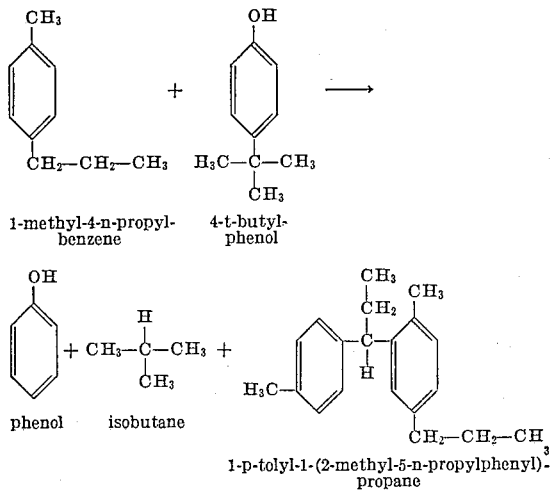

The diarylalkanes formed by the hydrogen transfer reactions referred to in the foregoing equations are alkylated diphenylalkanes, with one of the phenyl rings having one more alkyl group substituent than the other phenyl ring. These hydrogen transfer products may thus be referred to as unsymmetrical alkyl-diphenylalkanes.

The reaction of this process differs from those obtained by similarly treating a tertiary alkylated phenol and an aromatic hydrocarbon having two hydrocarbon radical substituents in para positions to each other and in which each of these radicals has only one or no replaceable hydrogen atoms combined with the alpha carbon atom (that is, the carbon atom that is joined to the aromatic ring) and the aromatic hydrocarbon contains a replaceable nuclear hydrogen atom. When the mentioned hydrocarbon radical of the aromatic hydrocarbon has only one alpha hydrogen atom, a hydrogen transfer and a condensation occur on contacting the aromatic hydrocarbon and a tertiary alkylated phenol in the presence of an acid-acting catalyst to produce an indan hydrocarbon and to convert the tertiary alkylated phenol into phenol and a hydrocarbon having the same carbon skeleton as the tertiary alkylating group, that is, a tertiary alkyl group or tertiary cycloalkyl group. If the aromatic hydrocarbon being reacted with a tertiary alkylated phenol has no replaceable hydrogen atom combined with the alpha-carbon atom of a hydrocarbon radical substituent, that is, if the substituent radical is a tertiary hydrocarbon group, such an aromatic hydrocarbon and a tertiary alkylated phenol in the presence of an acid-acting catalyst may undergo an alkyl transfer reaction, but will not give a hydrogen transfer reaction. Thus 1-methyl-4-tertiary-butylbenzene and tertiary amylphenol react in the presence of an acid-acting catalyst to form 1-methyl-2-tertiary amyl-4-tertiary butyl benzene and phenol.

The aromatic hydrocarbon used in this process must contain at least one para arrangement of hydrocarbon radical substituents in order to give the hydrogen transfer reaction and yield a diarylalkane. Also one of the substituents in the para arrangement must contain only two hydrogen atoms combined with the carbon atom that is joined to the aromatic ring. Of such aromatic hydrocarbons suitable for the process, the benzene hydrocarbons may be represented by the formula:

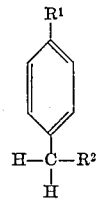

wherein each of $R^1$ and $R^2$ is selected from the group consisting of an alkyl radical, a cycloalkyl radical, a cycloalkalkyl radical, and a bicycloalkyl radical. The combination of the different R groups should be balanced so as to avoid steric hindrance. Also aromatic hydrocarbons and particularly benzene hydrocarbons containing more than three hydrocarbon substituent groups, may also be present in an aromatic hydrocarbon charging stock provided that about 50 mole per cent of the aromatic hydrocarbons have a replaceable hydrogen atom combined with a nuclear carbon atom. Thus the present process could utilize a highly alkylated benzene, such as pentaethylbenzene for producing 1-tetraethylphenyl-1-(2,3,4,5,6-pentaethylphenyl)-ethane or even a mixture of about equal molecular proportions of hexaethylbenzene and pentaethylbenzene for producing 1 - pentaethylphenyl-1-(2,3,4,5,6-pentaethylphenyl)-ethane.

Suitable aromatic hydrocarbon starting materials include particularly 1-methyl-4-ethylbenzene, 1-methyl-4-n-propylbenzene, 1,4-diethylbenzene, 1,4-di-n-propylbenzene, etc.

The tertiary alkylated phenols used as starting materials in this process comprise tertiary alkyl and tertiary cycloalkyl phenols including tertiary butyl phenol, tertiary amylphenol, and other tertiary alkyl phenols in which the substituent group contains more than five carbon atoms, tertiary methylcyclohexyl phenol, and the like. These tertiary alkylated phenols may be formed by alkylating phenol with a tertiary olefin in the presence of an acid-acting catalyst. Thus the interaction of phenol with isobutylene in the presence of phosphoric acid catalyst produces tertiary butyl phenol while similar interaction of a branched-chain pentene with phenol yields a tertiary amyl phenol.

The process as herein described is carried out in the presence of an acid-acting catalyst at conditions necessary for the hydrogen transfer reaction. Suitable acid-acting catalysts include mineral acids, such as sulfuric acid, chlorosulfonic acid, fluorosulfonic acid, hydrogen fluoride, hydroxyborofluoric acids, fluorophosphoric acids, phosphoric acids and Friedel-Crafts halide catalysts, particularly aluminum chloride, aluminum bromide, ferric chloride, zirconium chloride, boron fluoride. Since in some cases Friedel-Crafts catalysts may cause an alkyl migration within the aromatic ring before the hydrogen transfer reaction occurs, it is sometimes advantageous to use Friedel-Crafts complexes, such as etherate, alcoholate, etc., for this reaction.

Phosphoric acid catalyst comprises orthophosphoric acid and also polyphosphoric acids such as pyrophosphoric acid, triphosphoric acid, and tetraphosphoric acid. Under certain conditions of operation various acid-acting, oxide-type catalysts may be used which include activated clays, silica-alumina composites, and other silica-containing materials which are generally utilizable as catalysts for hydrocarbon cracking.

The operating conditions used in the process are dependent upon the nature of the hydrocarbons and tertiary phenols being treated and also upon the catalysts employed. When utilizing strong mineral acids, such as hydrogen fluoride, sulfuric acid, fluorosulfonic acid, chlorosulfonic acid, and the like, and also Friedel-Crafts metal halides promoted by a hydrogen halide such as hydrogen chloride, the process is carried out at a temperature of from about −30° to about 100° C. and at a pressure up to about 100 atmospheres. However, in the presence of hydrogen fluoride, sulfuric acid, and aluminum chloride catalysts the preferred operating temperature is preferably from about 0° to about 50° C. while in contact with ferric chloride catalyst the preferred operating temperature is from about 50° to about 100° C. Silica-alumina and other synthetic oxide catalysts and clays are generally used at a temperature of from about 200° to about 400° C., and at a superatmospheric pressure generally not in excess of about 100 atmospheres.

Our process is carried out in either batch or continuous type of operation. In batch-type operation the usual procedure consists in placing a mineral acid or Friedel-Crafts catalyst and a portion, generally about 50%, of the aromatic hydrocarbon in a reactor provided with a mechanically driven stirrer, cooling these materials to a temperature of from about 0° to about 10° C. and adding thereto with stirring, a solution of the tertiary alkylated phenol in the remainder of the aromatic hydrocarbon. The reaction mixture is then separated and the product is washed, dried, and distilled to recover therefrom the diarylalkane hydrocarbons. Unconverted aromatic hydrocarbons recovered in this distillation are utilizable in the further operation of the process.

The process is also carried out in a continuous manner by passing the aromatic and tertiary alkylated phenol, through a suitable reactor in which they are contacted in the presence of the catalyst, the latter either as a liquid or as a solid, depending upon the catalyst employed in the process. When using mineral acid catalysts such as sulfuric acid, chlorosulfonic acid, or hydrogen fluoride, this catalytic material is introduced continuously to the reactor which is provided with suitable mixing means and the resultant product is then separated into a hydrocarbon layer and a catalyst layer, the latter being returned to further use in the process while the hydrocarbon layer is washed, dried, and distilled as hereinabove set forth. When a solid catalyst such as silica-alumina, clay, or a supported Friedel-Crafts type catalyst is used as a fixed bed in the reactor and the aromatic and cycloolefinic hydrocarbons are passed therethrough, the resultant product may be washed with caustic to remove the phenol from the hydrocarbon material and the latter may then be distilled to separate unconverted aromatic hydrocarbons from the desired diaryl alkane hydrocarbon product.

In order to obtain relatively high yields of diarylalkane hydrocarbons by our process, it is necessary to use rather carefully selected hydrocarbon fractions as charging stocks. As already indicated herein, only certain types of aromatic hydrocarbons, namely, those containing particular substituents and readily replaceable nuclear hydrogen atoms are utilizable as starting materials to produce diarylalkane hydrocarbons.

Thus 1-methyl-4-ethylbenzene and related alkylbenzene hydrocarbons react readily with a tertiary alkylated phenol to form a diphenylalkane, a phenol, and a saturated hydrocarbon, the latter having substantially the same carbon skeleton as that of the tertiary group of the tertiary alkylated phenol charged to the process. An aromatic hydrocarbon which does not contain the aforementioned hydrocarbon radical substituents in para positions to each other does not react with a tertiary alkylated phenol to give the desired hydrogen transfer reaction. Accordingly, in order to obtain hydrogen transfer reaction rather than alkylation, it is necessary to use a tertiary alkylated phenol together with a disubstituted benzene hydrocarbon or other disubstituted aryl hydrocarbon in which the hydrocarbon substituents are in para positions to each other and one of said substituents comprises an ethyl group, a normal propyl group, or other hydrocarbon group in which two and only two hydrogen atoms are combined with the carbon atom adjacent to the aromatic nucleus, that is, the carbon atom in alpha position to the aromatic ring.

The diarylalkane hydrocarbons formed in this process may be sulfonated and hydrolyzed to produce phenols or they may be nitrated and reduced to the corresponding amines, such amines may then be azotized and converted into phenols which may be useful as inhibitors to retard oxidation of hydrocarbons, fats, vegetable oils, foods, etc. The sulfonation product of a diarylalkane containing a long alkyl, cycloalkalkyl, or cycloalkyl group may also be converted into a surface-active agent such as a wetting agent or detergent. Some of the diarylalkane hydrocarbons formed in this process may also be useful as additives in lubricating oils.

The following example is given to illustrate the character of results obtained by the use of specific embodiments of the present invention, although the data presented are not introduced with the intention of unduly restricting the generally broad scope of the invention.

90 grams (0.75 M.) of 1-methyl-4-ethylbenzene, 41 grams (0.25 M.) of para-tertiary amylphenol and 60 grams of substantially anhydrous hydrogen fluoride were stirred in a copper reactor for 2 hours at a temperature of 0° to 5° C. The resultant reaction mixture was then poured into ice and the organic material was separated from the acid and washed with water. The organic material was then extracted with caustic soda solution to remove phenols from the hydrocarbon product. The caustic soda solution was then acidified with hydrochloric acid and the liberated phenols were washed, dried, and distilled. About one-third of the 1-methyl-4-ethylbenzene reacted to form 1-para-tolyl-1-(2-methyl-5-ethylphenyl)ethane which boiled at 155–161° C. at 5 mm. pressure. Small amounts of amyl-p-ethyltoluene formed and also phenol formed from the tertiary amyl phenol.

We claim as our invention:

1. A process for producing an unsymmetrical diarylalkane hydrocarbon which comprises reacting at hydrogen transfer conditions in the presence of an acid-acting catalyst a tertiary alkylated phenol and an aromatic hydrocarbon having two hydrocarbon radical substituents in para position to each other and in which at least one of these radicals has only two hydrogen atoms combined with the carbon atom that is joined to the aromatic ring.

2. A process for producing an unsymmetrical diarylalkane hydrocarbon which comprises reacting at hydrogen transfer conditions in the presence of an acid-acting catalyst a tertiary alkyl phenol and an aromatic hydrocarbon having two hydrocarbon radical substituents in para positions to each other and in which at least one of these radicals has only two hydrogen atoms combined with the carbon atom that is joined to the aromatic ring.

3. A process for producing an unsymmetrical diarylalkane hydrocarbon which comprises reacting at hydrogen transfer conditions in the presence of an acid-acting catalyst a tertiary cycloalkylphenol and an aromatic hydrocarbon having two hydrocarbon radical substituents in para positions to each other and in which at least one of these radicals has only two hydrogen atoms combined with the carbon atom that is joined to the aromatic ring.

4. A process for producing an unsymmetrical diarylalkane hydrocarbon which comprises reacting at hydrogen transfer conditions in the presence of an acid-acting catalyst a tertiary alkylated phenol and a benzene hydrocarbon of the formula:

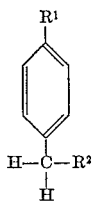

wherein each of R¹ and R² is selected from the group consisting of an alkyl radical, a cycloalkyl radical, a cycloalkalkyl radical, and a bicycloalkyl radical.

5. A process for producing an unsymmetrical diarylalkane hydrocarbon which comprises reacting in the presence of a mineral acid catalyst at a temperature of from about −30° to about 100° C. a tertiary alkylated phenol and an aromatic hydrocarbon having a replaceable nuclear hydrogen atom and two hydrocarbon radical substituents in para positions to each other and in which at least one of said radical substituents has only two hydrogen atoms combined with the carbon atom that is joined to the aromatic ring.

6. A process for producing an unsymmetrical diphenylalkane hydrocarbon which comprises reacting in the presence of a mineral acid catalyst at a temperature of from about −30° to about 100° C. a tertiary alkylated phenol and a benzene hydrocarbon having a replaceable nuclear hydrogen atom and two hydrocarbon radical substituents in para positions to each other and in which at least one of said radical substituents has only two hydrogen atoms combined with the carbon atom that is joined to the aromatic ring.

7. A process for producing an unsymmetrical diphenylalkane hydrocarbon which comprises reacting in the presence of a mineral acid catalyst at a temperature of from about −30° to about 100° C. a tertiary alkyl phenol and a benzene hydrocarbon having a replaceable nuclear hydrogen atom and two hydrocarbon radical substituents in para positions to each other and in which at least one of said radical substituents has only two hydrogen atoms combined with the carbon atom that is joined to the aromatic ring.

8. A process for producing an unsymmetrical diphenylalkane hydrocarbon which comprises reacting in the presence of a mineral acid catalyst at a temperature of from about −30° to about 100° C. a tertiary cycloalkylphenol and a benzene hydrocarbon having a replaceable nuclear hydrogen atom and two hydrocarbon radical substituents in para positions to each other and in which at least one of said radical substituents has only two hydrogen atoms combined with the carbon atom that is joined to the aromatic ring.

9. A process for producing an unsymmetrical diphenylalkane hydrocarbon which comprises reacting in the presence of a hydrogen fluoride catalyst at a temperature of from about −30° to about 100° C. a tertiary alkylated phenol and a benzene hydrocarbon having a replaceable nuclear hydrogen atom and two hydrocarbon radical substituents in para positions to each other and in which at least one of said radical substituents has only two hydrogen atoms combined with the carbon atom that is joined to the aromatic ring.

10. A process for producing an unsymmetrical diphenylalkane hydrocarbon which comprises reacting in the presence of a hydrogen fluoride catalyst at a temperature of from about −30° to about 100° C. a tertiary alkylphenol and a benzene hydrocarbon having a replaceable nuclear hydrogen atom and two hydrocarbon radical substituents in para positions to each other and in which at least one of said radical substituents has only two hydrogen atoms combined with the carbon atom that is joined to the aromatic ring.

11. A process for producing an unsymmetrical diphenylalkane hydrocarbon which comprises reacting in the presence of a hydrogen fluoride catalyst at a temperature of from about −30° to about 100° C. a tertiary cycloalkylphenol and a benzene hydrocarbon having a replaceable nuclear hydrogen atom and two hydrocarbon radical substituents in para positions to each other and in which at least one of said radical substituents has only two hydrogen atoms combined with the carbon atom that is joined to the aromatic ring.

12. A process for producing 1-p-tolyl-1-(2-methyl-5-ethylphenyl)-ethane which comprises reacting 1-methyl-4-ethylbenzene and a tertiary alkylated phenol in the presence of a mineral acid catalyst at a temperature of from about −30° to about 100° C.

13. A process for producing 1-p-tolyl-1-(2-methyl-5-ethylphenyl)-ethane which comprises reacting 1-methyl-4-ethylbenzene and a tertiary alkylated phenol in the presence of a mineral acid catalyst at a temperature of from about 0° to about 50° C.

14. A process for producing 1-p-tolyl-1-(2-methyl-5-ethylphenyl)-ethane which comprises reacting 1-methyl-4-ethylbenzene and a tertiary alkylated phenol in the presence of a sulfuric acid catalyst at a temperature of from about 0° to about 50° C.

15. A process for producing 1-p-tolyl-1-(2-methyl-5-ethylphenyl)-ethane which comprises reacting 1-methyl-4-ethylbenzene and a tertiary alkylated phenol in the presence of a hydrogen fluoride catalyst at a temperature of from about 0° to about 50° C.

16. A process for producing 1-p-tolyl-1-(2-methyl-5-n-propylphenyl)-propane which comprises reacting 1-methyl-4-n-propylbenzene and a tertiary alkylated phenol in the presence of a hydrogen fluoride catalyst at a temperature of from about 0° to about 50° C.

VLADIMIR N. IPATIEFF.
HERMAN PINES.

No references cited.